(12) United States Patent
Shigemitsu

(10) Patent No.: US 8,986,135 B2
(45) Date of Patent: Mar. 24, 2015

(54) GOLF BALL

(75) Inventor: Takahiro Shigemitsu, Kobe (JP)

(73) Assignee: SRI Sports Limited, Kobe (JP)

( * ) Notice: Subject to any disclaimer, the term of this patent is extended or adjusted under 35 U.S.C. 154(b) by 934 days.

(21) Appl. No.: 12/881,913

(22) Filed: Sep. 14, 2010

(65) Prior Publication Data

US 2011/0105248 A1 May 5, 2011

(30) Foreign Application Priority Data

Oct. 29, 2009 (JP) .................................. 2009-248896

(51) Int. Cl.
*A63B 37/06* (2006.01)
*C08K 5/09* (2006.01)
*A63B 37/00* (2006.01)

(52) U.S. Cl.
CPC .............. *C08K 5/09* (2013.01); *A63B 37/0003* (2013.01); *A63B 37/0087* (2013.01); *A63B 37/0033* (2013.01); *A63B 37/0045* (2013.01); *A63B 37/0062* (2013.01); *A63B 37/0063* (2013.01); *A63B 37/0064* (2013.01); *A63B 37/0065* (2013.01); *A63B 2037/0079* (2013.01)
USPC ...................................................... 473/373

(58) Field of Classification Search
USPC .......................................... 473/373, 374, 376
See application file for complete search history.

(56) References Cited

U.S. PATENT DOCUMENTS

| | | | |
|---|---|---|---|
| 4,483,537 A * | 11/1984 | Hanada et al. ................. | 473/372 |
| 5,306,760 A | 4/1994 | Sullivan | |
| 5,312,857 A | 5/1994 | Sullivan | |
| 5,452,898 A * | 9/1995 | Yamagishi et al. ........... | 473/377 |
| 6,100,321 A | 8/2000 | Chen | |
| 6,329,458 B1 | 12/2001 | Takesue et al. | |
| 7,118,494 B2 * | 10/2006 | Higuchi et al. ................ | 473/373 |
| 7,510,488 B2 * | 3/2009 | Higuchi et al. ................ | 473/373 |

FOREIGN PATENT DOCUMENTS

| | | |
|---|---|---|
| JP | 58-118775 A | 7/1983 |
| JP | 2000-157646 A | 6/2000 |
| JP | 2002-514112 A | 5/2002 |
| JP | 2003-506498 A | 2/2003 |
| WO | WO 01/09199 A1 | 2/2001 |

OTHER PUBLICATIONS

Translation of Japanese Office Action dated Jun. 12, 2012 for corresponding Application No. 2009-248896.

* cited by examiner

*Primary Examiner* — Raeann Gorden
(74) *Attorney, Agent, or Firm* — Birch, Stewart, Kolasch & Birch, LLP

(57) ABSTRACT

An object of the present invention is to provide a novel technology to improve the resilience of the ionomer resin while keeping the material strength of the ionomer resin. That is, the object of the present invention is to provide a golf ball excellent in the durability and resilience in a golf ball using an ionomer resin. The present invention provides a golf ball comprising a core having a center and at least one intermediate layer disposed around the center, and a cover disposed around the core, wherein at least one of the center, the intermediate layer, and the cover is formed from an ionomer resin composition which comprises 100 parts by mass of (A) an ionomer resin of a ternary copolymer composed of ethylene, $\alpha,\beta$-unsaturated carboxylic acid having 3 to 8 carbon atoms and $\alpha,\beta$-unsaturated carboxylic acid ester, and from 0.05 part to 10 parts by mass of (B) a metal salt of an unsaturated carboxylic acid.

15 Claims, No Drawings

GOLF BALL

FIELD OF THE INVENTION

The present invention relates to a golf ball, more particularly to a golf ball using a novel ionomer resin composition.

DESCRIPTION OF THE RELATED ART

Ionomer resins and polyurethane are used as materials for constituting golf balls. Use of the ionomer resins as the constituting material of the golf ball provides the golf ball traveling a great distance, because of its high stiffness. Accordingly, ionomer resins are widely used as a material constituting a cover or an intermediate layer of the golf ball. However, there still remains a room for further improvement with respect to the stiffness and fluidity thereof and various improvements have been proposed for improving these properties.

Japanese Patent Publication No. 2000-157646 A discloses a golf ball cover composition having a melt index (MI) of 1 dg/sec. or more and primarily comprising a mixture of a base resin, blended with (d) a metal soap obtained by neutralizing an organic acid having up to 29 carbon atoms with a monovalent to trivalent metal ion, in a mass ratio of the base resin to the metal soap being 95:5 to 80:20, wherein the base resin comprises an ionomer resin component containing (a) a ternary ionomer resin consisting of a metal ion neutralized product of an olefin-unsaturated carboxylic acid-unsaturated carboxylate copolymer having an acid content of 12 wt % or less, and (b) a binary ionomer resin consisting of a metal ion neutralized product of an olefin-unsaturated carboxylic acid copolymer having an acid content of 15 wt % or less in a ratio of 40:60 to 100:0; and (c) an unneutralized random copolymer composed of olefin and unsaturated carboxylic acid monomers, in a mass ratio of the ionomer resin component to (c) the unneutralized random copolymer being 75:25 to 100:0

JP2002-514112 T discloses a golf ball having a core and a cover, or a wound center and a cover, the core or center comprising; (i) an ionomeric polymer containing a) ethylene, b) from 5 to 25 weight percent (meth)acrylic acid, c) from 0 to 40 weight percent of a 1 to 8C-alkyl, alkyl acrylate, the acid groups neutralized to between 10 and 90 percent with zinc, sodium, lithium, calcium, magnesium ions and a mixture of any of these, and (ii) from 5 to 45 weight percent, based on (i) plus (ii), of a metal stearate, the metal selected from the group consisting of calcium, sodium, zinc, lithium, magnesium and barium or a mixture of said metal stearates.

U.S. Pat. No. 5,306,760 discloses a golf ball comprising a core and a cover, wherein the cover consists essentially of 100 parts by weight of at least one ionomer resin and from about 25 to about 100 parts by weight of fatty acid salt, wherein said ionomer resin is the reaction product of an olefin having from 2 to 8 carbon atoms and an unsaturated monocarboxylic acid having from 3 to 8 carbon atoms. U.S. Pat. No. 5,312,857 discloses a golf ball comprising a core and a cover, wherein the cover consists essentially of 100 parts by weight of at least one ionomer resin and from about 25 to about 100 parts by weight of a metal stearate, wherein said ionomer resin is the reaction product of an olefin having from 2 to 8 carbon atoms and an unsaturated monocarboxylic acid having from 3 to 8 carbon atoms. JP2003-506498T discloses a high melt swell polymer consisting essentially of an alpha olefin/C3-8 α,β-ethylenically unsaturated carboxylic acid copolymer partially neutralized by an alkali metal or an alkali earth metal cation and about 0.05 to about 10 wt. % of a metal acrylate (wt. % based on weight of polymer).

SUMMARY OF THE INVENTION

In order to improve the resilience of the ionomer resin, it is known to employ the ionomer resin having a high degree of neutralization. However, since the ionomer resin having a high degree of neutralization has low fluidity, it is difficult to mold the cover or intermediate layer. As a technology of improving the fluidity of the ionomer resin having a high degree of neutralization, it is known that a low molecular material like a fatty acid is added to the ionomer resin having a high degree of neutralization. However, in order to strike a balance between the resilience and fluidity, it is necessary to add the low molecular weight material in a considerable amount, which lowers the material strength, and more specifically lowers the durability of the golf ball. The present invention has been achieved in view of the above circumstance. An object of the present invention is to provide a novel technology to improve the resilience of the ionomer resin while keeping the material strength of the ionomer resin. Another object of the present invention is to provide a golf ball excellent in the durability and resilience in a golf ball using an ionomer resin.

The present invention, which has solved the above problems, provides a golf ball comprising a core having a center and at least one intermediate layer disposed around the center, and a cover disposed around the core, wherein at least one of the center, the intermediate layer, and the cover is formed from an ionomer resin composition which comprises 100 parts by mass of (A) an ionomer resin of a ternary copolymer composed of ethylene, α,β-unsaturated carboxylic acid having 3 to 8 carbon atoms and α,β-unsaturated carboxylic acid ester (hereinafter, sometimes may be abbreviated to "(A) ternary ionomer resin"), and from 0.05 part to 10 parts by mass of (B) a metal salt of an unsaturated carboxylic acid. The gist of the present invention resides in that the resilience of the ternary ionomer resin is enhanced by adding the metal salt of the unsaturated carboxylic acid, while keeping the material strength. Further, use of (B) the metal salt of the unsaturated carboxylic acid provides an improved effect, even if the added amount is small.

According to the present invention, it is possible to improve the resilience of the ionomer resin while keeping the material strength and provide a golf ball excellent in the resilience and durability.

DESCRIPTION OF THE PREFERRED EMBODIMENT

The present invention provides a golf ball comprising a core having a center and at least one intermediate layer disposed around the center, and a cover disposed around the core, wherein at least one of the center, the intermediate layer, and the cover is formed from an ionomer resin composition which comprises 100 parts by mass of (A) an ionomer resin of a ternary copolymer composed of ethylene, α,β-unsaturated carboxylic acid having 3 to 8 carbon atoms and α,β-unsaturated carboxylic acid ester, and from 0.05 part to 10 parts by mass of (B) a metal salt of an unsaturated carboxylic acid.

First, (A) the ternary ionomer resin used in the present invention will be explained. The ionomer resin includes, for example, one prepared by neutralizing at least a part of carboxyl groups in a ternary copolymer composed of ethylene, α,β-unsaturated carboxylic acid having 3 to 8 carbon atoms, and α,β-unsaturated carboxylic acid ester with a metal ion.

Examples of the α,β-unsaturated carboxylic acid having 3 to 8 carbon atoms are acrylic acid, methacrylic acid, fumaric acid, maleic acid and crotonic acid. Among these, acrylic acid and methacrylic acid are particularly preferred. Examples of the α,β-unsaturated carboxylic acid ester include methyl ester, ethyl ester, propyl ester, n-butyl ester, isobutyl ester of acrylic acid, methacrylic acid, fumaric acid, maleic acid or the like. In particular, acrylic acid ester and methacrylic acid ester are preferable. Among them, as (A) the ternary ionomer resin, preferred is the metal ion-neutralized product of the ternary copolymer composed of ethylene-(meth)acrylic acid-(meth)acrylic acid ester. Herein, "(meth)acrylic acid" means acrylic acid and/or methacrylic acid.

The content of α,β-unsaturated carboxylic acid having 3 to 8 carbon atoms in (A) the ternary ionomer resin is preferably 2 mass % or more, more preferably 3 mass % or more, and is preferably 30 mass % or less, more preferably 25 mass % or less.

The degree of neutralization of the carboxyl groups of (A) the ternary ionomer resin is preferably 20 mole % or more, more preferably 30 mole % or more, and is preferably 90 mole % or less, more preferably 85 mole % or less. If the degree of the neutralization is 20 mole % or more, the resilience and durability of the obtained constituting member using the ionomer resin composition improves, while if the degree of the neutralization is 90 mole % or less, the fluidity of the ionomer resin composition improves (good moldability). The degree of neutralization of the carboxyl groups of (A) the ternary ionomer resin can be calculated by the following mathematical expression.

Degree of neutralization (mole %) of (A) the ternary ionomer resin=(the number of moles of neutralized carboxyl groups of the ternary ionomer resin/the number of moles of all carboxyl groups contained in the ternary ionomer resin)×100

Examples of the metal ion for neutralizing at least a part of carboxyl groups of the ternary ionomer resin include: monovalent metal ions such as sodium, potassium, lithium, or the like; divalent metal ions such as magnesium, calcium, zinc, barium, cadmium, or the like; trivalent metal ions such as aluminum or the like; and other metal ions such as tin, zirconium, or the like. In one preferable embodiment, (A) the ternary ionomer resin used in the present invention is neutralized with at least one metal ion selected from the group consisting of magnesium, zinc, and sodium.

Specific examples of the ternary ionomer resin include trade name "Himilan (registered trademark) (e.g. Himilan AM7327 (Zn), Himilan AM7331 (Na), Himilan 1855 (Zn), Himilan 1856 (Na), or the like)" commercially available from Du Pont-Mitsui Polychemicals Co., Ltd.

Further, the ternary ionomer resins commercially available from E.I. du Pont de Nemours and Company include trade name "Surlyn (registered trademark) (e.g. Surlyn 6320 (Mg), Surlyn 8120 (Na), Surlyn 8320 (Na), Surlyn 9320 (Zn), Surlyn 9320W (Zn) or the like)".

Further, ionomer resins commercially available from ExxonMobil Chemical Corporation include trade name "Iotek (registered trademark) (e.g. Iotek 7510 (Zn), Iotek 7520 (Zn) or the like)". It is noted that Na, Zn, Li, and Mg described in the parentheses after the trade names indicate metal types of neutralizing metal ions.

The ionomer resin composition of the present invention preferably contains, as a resin component, (A) the ternary ionomer only, but may further contain another thermoplastic elastomer or resin to the extent that the effect of the present invention is not deteriorated. In the case of containing another thermoplastic elastomer or resin, the content of (A) the ternary ionomer resin in the resin component is preferably 50 mass % or more, more preferably 60 mass % or more, even more preferably 70 mass % or more.

Examples of other thermoplastic elastomers are a thermoplastic polyamide elastomer having a commercial name of "Pebax (registered trademark) (e.g. "Pebax 2533")" commercially available from Arkema K. K.; a polyurethane elastomer having a commercial name of "Elastollan (registered trademark) (e.g. "Elastollan XNY85A")" commercially available from BASF Japan Ltd; a thermoplastic polyester elastomer having a commercial name of "Hytrel (registered trademark) (e.g. "Hytrel 3548", "Hytrel 4047")" commercially available from Du Pont-Toray Co., Ltd.; a thermoplastic polystyrene elastomer having a commercial name of "Rabalon (registered trademark) (e.g. "Rabalon T3221C")" commercially available from Mitsubishi Chemical Corporation. Examples of other thermoplastic resin include an ionomer resin of the binary copolymer composed of ethylene and α,β-unsaturated carboxylic acid having 3 to 8 carbon atoms.

Next, (B) the metal salt of the unsaturated carboxylic acid will be explained. (B) the metal salt of the unsaturated carboxylic acid preferably contains α,β-unsaturated carboxylic acid having 3 to 8 carbon atoms as an unsaturated carboxylic acid component thereof. Examples of the α,β-unsaturated carboxylic acid having 3 to 8 carbon atoms are acrylic acid, methacrylic acid, fumaric acid, maleic acid and crotonic acid. Among these, acrylic acid and methacrylic acid are particularly preferred. Examples of the metal ion constituting (B) the metal salt of the unsaturated carboxylic acid includes: monovalent metal ions such as sodium, potassium, lithium, rubidium, cesium, francium, or the like; divalent metal ions such as magnesium, calcium, zinc, beryllium, strontium, barium, radium, or the like; trivalent metal ions such as aluminum or the like. The metal components can be used solely or as a combination of at least two of them. Among them, (B) the metal salt of the unsaturated carboxylic acid is preferably a zinc salt, more preferably zinc acrylate or zinc methacrylate.

The ionomer resin composition used in the present invention preferably contains (B) the metal salt of the unsaturated carboxylic acid in an amount of 0.05 part or more, more preferably 0.08 part or more, even more preferably 0.1 part or more with respect to 100 parts of (A) the ternary ionomer resin by mass. If the content of (B) the metal salt of the unsaturated carboxylic acid is 0.05 part or more, the resilience of (A) the ternary ionomer resin improves. If the content of (B) the metal salt of the unsaturated carboxylic acid is too high, the fluidity deteriorates. Therefore, the content of (B) the metal salt of the unsaturated carboxylic acid is preferably 10 parts or less, more preferably 8 parts or less, even more preferably 5 parts or less, with respect to 100 parts of (A) the ternary ionomer resin by mass.

The ionomer resin composition of the present invention may further contain a pigment component such as a white pigment (for example, titanium oxide), a blue pigment (for example, ultramarine blue), a red pigment, or the like; a specific gravity adjusting agent such as zinc oxide, calcium carbonate, barium sulfate, or the like; a dispersant; an antioxidant; an ultraviolet absorber; a light stabilizer; a fluorescent material; a fluorescent brightener; or the like, as long as they do not impair the performance of the golf ball.

The amount of the white pigment (for example, titanium oxide), with respect to 100 parts by mass of the resin component, is preferably 0.5 part by mass or more, more preferably 1 part by mass or more, and is preferably 10 parts by mass or less, more preferably 8 parts by mass or less. If the amount of the white pigment is 0.5 parts by mass or more, it is possible to impart the opacity to the constituting member of the golf ball. If the amount of the white pigment is more than 10 parts by mass, the durability of the constituting member of the golf ball may deteriorate.

The ionomer resin composition used in the present invention can be obtained, for example, by dry blending (A) the ternary ionomer resin and (B) the metal salt of the unsaturated carboxylic acid, followed by extruding them in the form of pellet. The dry blending may be carried out using for example, a mixer capable of blending a raw material in the form of pellet, more preferably a tumbler type mixer. In addition to the dry blending, the materials may be supplied respectively by the respective feeding machines. Extruding can be carried out by publicly known extruders such as a single-screw kneading extruder, a twin-screw kneading extruder, and a twin-single kneading extruder. The extruding condition is not particularly limited. For example, in the case of extruding with a twin-screw kneading extruder, the preferable conditions are screw diameter=45 mm; screw revolutions=50 rpm to 400 rpm; screw L/D=35 or less, and die temperature; 140° C. to 250° C.

The melt flow rate (190° C., 2.16 kg) of the ionomer resin composition is preferably 0.01 g/10 min or more, more preferably 0.05 g/10 min or more, and even more preferably 0.1 g/10 min or more, and is preferably 100 g/10 min or less, more preferably 80 g/10 min or less, and even more preferably 50 g/10 min or less. If the melt flow rate of the ionomer resin composition falls within the above range, it is easy to mold the intermediate layer or the cover from the ionomer resin composition.

The ionomer resin composition used in the present invention preferably has a bending stiffness of 10 MPa or more, more preferably 15 MPa or more, even more preferably 20 MPa or more, and preferably has a bending stiffness of 450 MPa or less, more preferably 400 MPa or less, even more preferably 350 MPa or less. Use of the ionomer resin composition having a bending stiffness of 10 MPa or more provides a golf ball excellent in the resilience (flight distance). On the other hand, if the bending stiffness is 450 MPa or less, the obtained golf ball becomes appropriately soft and thus the shot feeling becomes good.

The ionomer resin composition used in the present invention preferably has a rebound resilience of 40% or more, more preferably 43% or more, even more preferably 46% or more. Use of the ionomer resin composition having a rebound resilience of 40% or more provides a golf ball excellent in the resilience (flight distance). Herein, the bending stiffness and the rebound resilience of the ionomer resin composition are measured by molding the ionomer resin composition into a sheet form. The method for the measurement is described later.

The ionomer resin composition used in the present invention preferably has a slab hardness of 20 or more, more preferably 25 or more, even more preferably 30 or more, and preferably has a slab hardness of 70 or less, more preferably 65 or less, even more preferably 60 or less, even more preferably 50 or less in Shore D hardness. Use of the ionomer resin composition having a slab hardness of 20 or more in Shore D hardness provides a golf ball excellent in the resilience (flight distance). On the other hand, use of the ionomer resin composition having a slab hardness of 70 or less provides a golf ball excellent in the durability. Herein, the slab hardness of the ionomer resin composition is a measured hardness of the ionomer resin composition that is molded into a sheet form by a measuring method described later.

The golf ball of the present invention comprises a core having a center and at least one intermediate layer disposed around the center, and a cover disposed around the core, wherein at least one of the center, the intermediate layer, and the cover is formed from the ionomer resin composition described above.

The golf ball of the present invention preferably includes a golf ball comprising a core having a center and at least one intermediate layer disposed around the center, and a cover disposed around the core, wherein at least one of the intermediate layer is formed from the ionomer resin composition; a golf ball comprising a core having a center and at least one intermediate layer disposed around the center, and a cover disposed around the core, wherein the center is formed from the ionomer resin composition; and a golf ball comprising a core having a center and at least one intermediate layer disposed around the center, and a cover disposed around the core, wherein the cover is formed from the ionomer resin composition.

In the case that the intermediate layer is formed from the ionomer resin composition described above, the thickness of the intermediate layer is preferably 2.0 mm or less, more preferably 1.8 mm or less, even more preferably 1.6 mm or less, even more preferably 1.2 mm or less. If the thickness of the intermediate layer is 2.0 mm or less, the resilience and shot feeling of the obtained golf ball becomes better. The thickness of the intermediate layer is preferably 0.1 mm or more, more preferably 0.3 mm or more, even more preferably 0.5 mm or more. If the thickness of the intermediate layer is 0.1 mm or more, it is easier to mold the intermediate layer. Further, the durability of the resultant golf ball is enhanced.

In the case that the center is formed from the ionomer resin composition described above, the diameter of the center is preferably 34.8 mm or more, more preferably 35.0 mm or more, and even more preferably 35.2 mm or more, and is preferably 41.2 mm or less, more preferably 41.0 mm or less, and even more preferably 40.8 mm or less. If the diameter of the center is 34.8 mm or more, the intermediate layer or the cover layer does not become excessively thick, and hence the resilience of the golf ball becomes good. On the other hand, if the diameter of the center is 41.2 mm or less, the intermediate layer or the cover does not become excessively thin, and hence the intermediate layer or the cover functions better.

In the case that the cover is formed from the ionomer resin composition described above, the thickness of the cover of the golf ball is preferably 2.0 mm or less, more preferably 1.6 mm or less, even more preferably 1.2 mm or less, even more preferably 1.0 mm or less. If the thickness of the cover is 2.0 mm or less, the resilience and shot feeling of the obtained golf ball become better. The thickness of the cover is preferably 0.1 mm or more, more preferably 0.2 mm or more, and even more preferably 0.3 mm or more. If the thickness of the cover is less than 0.1 mm, it may become difficult to mold the cover. In addition, the durability and the abrasion resistance of the cover may deteriorate.

When the golf ball of the present invention has a diameter in a range from 40 mm to 45 mm, a compression deformation amount of the golf ball (an amount of compression of the golf ball in the compression direction thereof) when applying a load from 98 N as an initial load to 1275 N as a final load to the golf ball is preferably 2.0 mm or more, more preferably 2.2 mm or more, and is preferably 4.0 mm or less, more preferably 3.5 mm or less. If the compression deformation amount is 2.0 mm or more, the golf ball does not become excessively hard, and thus the shot feeling becomes better. If the compression deformation amount is 4.0 mm or less, the resilience is enhanced.

In the followings, the present invention will be explained in detail based on the preferable golf ball that comprises a core having a center and at least one intermediate layer disposed around the center and a cover disposed around the core, wherein at least one of the intermediate layer is formed from the above ionomer resin composition. However, the present invention is not limited to this embodiment.

In the preferable embodiment, the core of the golf ball of the present invention preferably includes, for example, a multi-layered core having a center and at least one intermediate layer covering the center. The core preferably has a spherical shape. If the core does not have a spherical shape, the cover does not have a uniform thickness. As a result, there exist some portions where the performance of the cover is lowered.

On the other hand, the center generally has the spherical shape, but the center may be provided with a rib on the surface thereof so that the surface of the spherical center is divided by the ribs. For example, the surface of the spherical center is evenly divided by the ribs. In one embodiment, the ribs are preferably formed on the surface of the spherical center in an integrated manner as a part of the center, and in another embodiment, the ribs are formed as an intermediate layer on the surface of the spherical center. The ribs are preferably formed along an equatorial line and meridians that evenly divide the surface of the spherical center, if the spherical center is assumed as the earth. For example, if the surface of the spherical center is evenly divided into 8, the ribs are formed along the equatorial line, any meridian as a standard, and meridians at the longitude 90 degrees east, longitude 90 degrees west, and the longitude 180 degrees east(west), assuming that the meridian as the standard is at longitude 0 degree. If the ribs are formed, the depressed portion divided by the ribs are preferably filled with a plurality of intermediate layers or with a single-layered intermediate layer that fills each of the depressed portions to make a core in the spherical shape. The shape of the ribs, without limitation, includes an arc or an almost arc (for example, a part of the arc is removed to obtain a flat surface at the cross or orthogonal portions thereof).

A conventionally known rubber composition (hereinafter, sometimes simply referred to as "center rubber composition") may be employed for the center of the golf ball of the present invention, and the center can be molded by, for example, heat-pressing a rubber composition containing a base rubber, a crosslinking initiator, a co-crosslinking agent, and a filler.

As the base rubber, a natural rubber and/or a synthetic rubber may be used. Examples of the base rubber are a polybutadiene rubber, a natural rubber, a polyisoprene rubber, a styrene polybutadiene rubber, and ethylene-propylene-diene terpolymer (EPDM). Among them, typically preferred is the high cis-polybutadiene having cis-1,4-bond in a proportion of 40% or more, more preferably 70% or more, even more preferably 90% or more in view of its superior resilience property.

The crosslinking initiator is blended to crosslink the base rubber component. As the crosslinking initiator, an organic peroxide is preferably used. Examples of the organic peroxide for use in the present invention are dicumyl peroxide, 1,1-bis(t-butyl peroxy)-3,5-trimethylcyclohexane, 2,5-dimethyl-2,5-di(t-butylperoxy)hexane, and di-t-butyl peroxide. Among them, dicumyl peroxide is preferable. An amount of the crosslinking initiator to be blended in the rubber composition is preferably 0.3 part by mass or more, more preferably 0.4 part by mass or more, and is preferably 5 parts by mass or less, more preferably 3 parts by mass or less based on 100 parts by mass of the base rubber. If the amount is less than 0.3 parts by mass, the center becomes too soft, and the resilience tends to be lowered, and if the amount is more than 5 parts by mass, the amount of the co-crosslinking agent must be increased in order to obtain the appropriate hardness, which tends to cause the insufficient resilience.

The co-crosslinking agent is not particularly limited as long as it serves to crosslink a rubber molecule by graft polymerization to a base rubber molecular chain; for example, α,β-unsaturated carboxylic acid having 3 to 8 carbon atoms or a metal salt thereof, more preferably acrylic acid, methacrylic acid or a metal salt thereof may be used. As the metal constituting the metal salt, for example, zinc, magnesium, calcium, aluminum and sodium may be used, and among them, zinc is preferred because it provides high resilience.

The amount of the co-crosslinking agent to be used is preferably 10 parts or more, more preferably 15 parts or more, even more preferably 20 parts or more, and is preferably 55 parts or less, more preferably 50 parts or less, even more preferably 48 parts or less, based on 100 parts of the base rubber by mass. If the amount of the co-crosslinking agent to be used is less than 10 parts by mass, the amount of the crosslinking initiator must be increased to obtain an appropriate hardness, which tends to lower the resilience. On the other hand, if the amount of the co-crosslinking agent to be used is more than 55 parts by mass, the center becomes too hard, so that the shot feeling may be lowered.

The filler contained in the center rubber composition is mainly blended as a specific gravity adjusting agent in order to adjust the specific gravity of the golf ball obtained as the final product in the range of 1.0 to 1.5, and may be blended as required. Examples of the filler include an inorganic filler such as zinc oxide, barium sulfate, calcium carbonate, magnesium oxide, tungsten powder, and molybdenum powder. The amount of the filler to be blended in the rubber composition is preferably 0.5 part or more, more preferably 1 part or more, and is preferably 30 parts or less, more preferably 20 parts or less based on 100 parts of the base rubber by mass. If the amount of the filler to be blended is less than 0.5 part by mass, it becomes difficult to adjust the weight, while if it is more than 30 parts by mass, the weight ratio of the rubber component becomes small and the resilience tends to be lowered.

As the center rubber composition, an organic sulfur compound, an antioxidant or a peptizing agent may be blended appropriately in addition to the base rubber, the crosslinking initiator, the co-crosslinking agent and the filler.

As the organic sulfur compound, diphenyl disulfide or a derivative thereof may be preferably used. Examples of the diphenyl disulfide or the derivative thereof include diphenyl disulfide; mono-substituted diphenyl disulfide such as bis(4-chlorophenyl) disulfide, bis(3-chlorophenyl) disulfide, bis(4-bromophenyl) disulfide, bis(3-bromophenyl) disulfide, bis(4-fluorophenyl) disulfide, bis(4-iodophenyl) disulfide and bis(4-cyanophenyl) disulfide; di-substituted diphenyl disulfide such as bis(2,5-dichlorophenyl) disulfide, bis(3,5-dichlorophenyl) disulfide, bis(2,6-dichlorophenyl) disulfide, bis(2,5-dibromophenyl) disulfide, bis (3,5-dibromophenyl) disulfide, bis(2-chloro-5-bromophenyl) disulfide, and bis(2-cyano-5-bromophenyl) disulfide; tri-substituted diphenyl disulfide such as bis (2,4,6-trichlorophenyl) disulfide, and bis(2-cyano-4-chloro-6-bromophenyl) disulfide; tetra-substituted diphenyl disulfide such as bis(2,3,5,6-tetra chlorophenyl) disulfide; penta-substituted diphenyl disulfide such as bis(2,3,4,5,6-pentachlorophenyl) disulfide and bis(2,3,4,5,6-pentabromophenyl) disulfide. These diphenyl disulfides or the derivative thereof can enhance resilience by having some influence on the state of vulcanization of vulcanized rubber.

Among them, diphenyl disulfide or bis(pentabromophenyl) disulfide is preferably used since the golf ball having particularly high resilience can be obtained. The amount of the diphenyl disulfide or the derivative thereof to be blended is preferably 0.1 part by mass or more, more preferably 0.3 part by mass or more, and is preferably 5.0 parts by mass or less, more preferably 3.0 parts by mass or less relative to 100 parts by mass of the base rubber.

The amount of the antioxidant to be blended is preferably 0.1 part or more and is preferably 1 part or less based on 100 parts of the base rubber by mass. Further, the amount of the peptizing agent is preferably 0.1 part or more and is preferably 5 parts or less based on 100 parts of the base rubber by mass.

The center can be obtained by mixing, kneading the above mentioned rubber composition and molding the rubber composition in the mold. The conditions for press-molding the center rubber composition should be determined depending on the rubber composition. For example, the press-molding is preferably carried out for 10 to 60 minutes at the temperature of 130° C. to 200° C. under the pressure from 2.9 MPa to 11.8 MPa. Specifically, the press-molding is preferably carried out for 10 to 60 minutes at the temperature of 130° C. to 200° C. Alternatively, the press-molding is preferably carried out in a two-step heating, for example, for 20 to 40 minutes at the temperature of 130° C. to 150° C., and continuously for 5 to 15 minutes at the temperature of 160° C. to 180° C.

The diameter of the center is preferably 34.8 mm or more, more preferably 35.0 mm or more, and even more preferably 35.2 mm or more, and is preferably preferably 41.2 mm or less, more preferably 41.0 mm or less, and even more preferably 40.8 mm or less. If the diameter of the center is 34.8 mm or more, the intermediate layer or the cover layer does not become excessively thick, and hence the resilience of the golf ball becomes good. On the other hand, if the diameter of the center is 41.2 mm or less, the intermediate layer or the cover does not become excessively thin, and hence the intermediate layer or the cover functions better.

When the center has a diameter from 34.8 mm to 41.2 mm, a compression deformation amount (shrinking deformation amount of the center along the compression direction) of the center when applying a load from 98 N as an initial load to 1275 N as a final load is preferably 1.90 mm or more, more preferably 2.00 mm or more, even more preferably 2.10 mm or more, and is preferably 4.00 mm or less, more preferably 3.90 mm or less, even more preferably 3.80 mm or less. If the compression deformation amount is 1.90 mm or more, the shot feeling becomes good, while if the compression deformation amount is 4.00 mm or less, the resilience becomes better.

The surface hardness of the center is preferably 40 or larger, more preferably 45 or larger, and even more preferably 55 or larger, and is preferably 65 or smaller, more preferably 62 or smaller, and even more preferably 60 or smaller in shore D hardness. If the surface hardness is 40 or more in Shore D hardness, the center does not become excessively soft and the resilience becomes good. If the surface hardness of the center is 65 or less in Shore D hardness, the core does not become so hard and the shot feeling becomes good.

The center hardness of the center is preferably 30 or larger, more preferably 32 or larger, and even more preferably 35 or larger in Shore D hardness. If the center hardness is smaller than 30 in Shore D hardness, the center becomes so soft that the resilience of the golf ball tends to become lower. The center hardness of the center is preferably 50 or smaller, more preferably 48 or smaller, and even more preferably 45 or smaller in Shore D hardness. If the center hardness is more than 50 in Shore D hardness, the center becomes too hard, resulting in the poor shot feeling. In the present invention, the center hardness of the center is the hardness measured with the Shore D type spring hardness tester at the central point of a cut plane of the center which has been cut into two halves.

In the above preferable embodiment, the intermediate layer is formed from the ionomer resin composition (hereinafter, sometimes merely referred to as "intermediate layer composition"), and for example, the intermediate layer is formed by covering the center with the intermediate layer composition. A method for molding the intermediate layer is not particularly limited, and includes an embodiment which comprises injection molding the intermediate layer composition directly onto the center, or an embodiment which comprises molding the intermediate layer composition into a half hollow-shell, covering the center with the two half hollow-shells, and subjecting the center with the two half hollow-shells to the compression-molding at the temperature of 130° C. to 170° C. for 1 min to 5 mins.

In the case of directly injection molding the intermediate layer composition onto the center, it is preferred to use upper and lower molds for forming the intermediate layer having a spherical cavity and pimples, wherein a part of the pimple also serves as a retractable hold pin. When forming the intermediate layer by injection molding, the hold pin is protruded to hold the center, and the intermediate layer composition which has been heated and melted is charged and then cooled to obtain the intermediate layer. For example, the intermediate layer composition heated and melted at the temperature of 150° C. to 230° C. is charged into a mold held under the pressure of 980 KPa to 1,500 KPa for 0.1 to 1 second. After cooling for 15 to 60 seconds, the mold is opened.

The thickness of the intermediate layer is preferably 2.0 mm or less, more preferably 1.8 mm or less, and even more preferably 1.6 mm or less, even more preferably 1.2 mm or less. If the thickness of the intermediate layer is 2.0 mm or less, the resilience and shot feeling of the golf ball is improved. The thickness of the intermediate layer is preferably 0.1 mm or more, more preferably 0.3 mm or more, even more preferably 0.5 mm or more. If the thickness of the intermediate layer is 0.1 mm or more, it is easier to mold the intermediate layer. Further, the durability of the resultant golf ball is enhanced.

In the above preferable embodiment, the diameter of the core of the golf ball is preferably 39.0 mm or more, more preferably 39.5 mm or more, and even more preferably 40.8 mm or more. If the diameter of the core is less than 39.0 mm, the cover becomes excessively thick and hence the resilience of the golf ball may deteriorate. Further, the diameter of the core is preferably 42.2 mm or less, more preferably 42.0 mm or less, and even more preferably 41.8 mm or less. If the diameter of the core is more than 42.2 mm, the thickness of the cover becomes relatively thin, and hence a protection effect of the cover is not obtained sufficiently.

In the above preferable embodiment, the cover of the golf ball of the present invention is formed from a cover composition containing a resin component. The resin component includes, for example, a polyurethane resin, an ionomer resin, a thermoplastic polyamide elastomer having a commercial name of "Pebax (registered trademark) (e.g. "Pebax 2533")" commercially available from Arkema K. K.; a thermoplastic polyester elastomer having a commercial name of "Hytrel (registered trademark) (e.g. "Hytrel 3548", "Hytrel 4047")" commercially available from Du Pont-Toray Co., Ltd.; a thermoplastic polystyrene elastomer having a commercial name of "Rabalon (registered trademark) (e.g. "Rabalon T3221C")" commercially available from Mitsubishi Chemical Corporation. These resin components are used solely or as a mixture of at least two of them.

In the above preferable embodiment, the cover composition preferably contains the polyurethane resin or the ionomer resin, as the resin component. The content of the polyurethane resin or the ionomer resin in the resin component of the cover composition is preferably 50 mass % or more, more preferably 60 mass % or more, even more preferably 70 mass % or more. In a more preferable embodiment, the cover composition contains the ionomer resin as the resin component. Since the ionomer resins are used for both of the cover and the intermediate layer, the adhesion between the intermediate layer and the cover will become much higher.

In the present invention, in addition to the aforementioned resin component, the cover composition may further contain a pigment component such as a white pigment (for example, titanium oxide), a blue pigment (for example, ultramarine blue), a red pigment, or the like; a specific gravity adjusting agent such as zinc oxide, calcium carbonate, barium sulfate, or the like; a dispersant; an antioxidant; an ultraviolet absorber; a light stabilizer; a fluorescent material; a fluorescent brightener; or the like, as long as they do not impair the performance of the cover.

The amount of the white pigment (for example, titanium oxide), with respect to 100 parts by mass of the resin component constituting the cover, is preferably 0.5 part by mass or more, more preferably 1 part by mass or more, and is preferably 10 parts by mass or less, more preferably 8 parts by mass or less. If the amount of the white pigment is 0.5 parts by mass or more, it is possible to impart the opacity to the cover. If the amount of the white pigment is more than 10 parts by mass, the durability of the cover may deteriorate.

A method for molding a cover is not particularly limited, and includes an embodiment which comprises injection molding the cover composition directly onto the core, or an embodiment which comprises molding the cover composition into a hollow-shell, covering the core with a plurality of the hollow-shells and subjecting the core with a plurality of the hollow shells to the compression-molding (preferably an embodiment which comprises molding the cover composition into a half hollow-shell, covering the core with the two half hollow-shells, and subjecting the core with the two half hollow-shells to the compression-molding).

In the case of molding the cover by injection molding the cover composition, the cover composition in the form of the pellet obtained by previously extruding can be used for the injection molding, or the cover materials can be dry blended and directly used for the injection molding. It is preferred to use upper and lower molds for forming a cover having a spherical cavity and pimples, wherein a part of the pimple also serves as a retractable hold pin. When forming the cover by injection molding, the hold pin is protruded to hold the core, and the cover composition which has been heated and melted is charged and then cooled to obtain a cover. For example, the cover composition heated and melted at the temperature of 200° C. to 250° C. is charged into a mold held under the pressure of 9 MPa to 15 MPa for 0.5 second to 5 seconds. After cooling for 10 to 60 seconds, the mold is opened and the golf ball with the cover molded is taken out from the mold.

When molding a cover, the concave portions called "dimple" are usually formed on the surface. The total number of the dimples is preferably 200 or more and 500 or less. If the total number is less than 200, the dimple effect is hardly obtained. On the other hand, if the total number exceeds 500, the dimple effect is hardly obtained because the size of the respective dimples is small. The shape (shape in a plan view) of dimples includes, for example, without limitation, a circle, polygonal shapes such as roughly triangular shape, roughly quadrangular shape, roughly pentagonal shape, and roughly hexagonal shape, another irregular shape. The shape of the dimples is employed solely or in combination at least two of them.

In the present invention, the thickness of the cover of the golf ball is preferably 2.0 mm or less, more preferably 1.6 mm or less, even more preferably 1.2 mm or less, even more preferably 1.0 mm or less. If the thickness of the cover is 2.0 mm or less, the resilience and shot feeling of the obtained golf ball become better. The thickness of the cover is preferably 0.1 mm or more, more preferably 0.2 mm or more, and even more preferably 0.3 mm or more. If the thickness of the cover is less than 0.1 mm, it may become difficult to mold the cover. In addition, the durability and the abrasion resistance of the cover may deteriorate.

After the cover is molded, the mold is opened and the golf ball body is taken out from the mold, and as necessary, the golf ball body is preferably subjected to surface treatments such as deburring, cleaning, and sandblast. If desired, a paint film or a mark may be formed. The paint film preferably has a thickness of, but not limited to, 5 μm or larger, and more preferably 7 μm or larger, and preferably has a thickness of 25 μm or smaller, and more preferably 18 μm or smaller. If the thickness is smaller than 5 μm, the paint film is easy to wear off due to continued use of the golf ball, and if the thickness is larger than 25 μm, the effect of the dimples is reduced, resulting in deteriorating flying performance of the golf ball.

The present invention is explained based on the embodiment where the ionomer resin composition used in the present invention is used for the intermediate layer, but the ionomer resin composition used in the present invention can be used for the center or the cover.

EXAMPLES

Hereinafter, the present invention will be described in detail by way of example. The present invention is not limited to examples described below. Various changes and modifications can be made without departing from the spirit and scope of the present invention.

[Evaluation Method]

(1) Hardness of Center (Shore D Hardness)

A type P1 auto loading durometer manufactured by Kobunshi Keiki Co., Ltd., provided with a Shore D type spring hardness tester prescribed in ASTM-D2240 was used to measure the surface hardness and the center hardness of the center. Shore D hardness measured at the surfaces of the center is defined as the surface hardness of the center. The center was cut into two hemispheres to obtain a cut plane, and a Shore D hardness measured at the central point of the cut plane was used as the center hardness of the center.

(2) Slab Hardness (Shore D Hardness)

Sheets with a thickness of about 2 mm were produced by injection molding the ionomer resin composition, and stored at 23° C. for two weeks. Three or more of these sheets were stacked on one another so as not to be affected by the measuring substrate on which the sheets were placed, and the hardness of the stack was measured with a type P1 auto loading durometer manufactured by Kobunshi Keiki Co., Ltd., provided with a Shore D type spring hardness tester prescribed in ASTM-D2240.

(3) Compression Deformation Amount (mm)

A compression deformation amount of the center, core and golf ball (a shrinking amount of the center, core, and golf ball in the compression direction thereof), when applying a load from 98 N as an initial load to 1275 N as a final load to the center, core and golf ball, was measured.

(4) Melt Flow Rate (MFR) (g/10 min)

The MFR was measured using a flow tester (Shimadzu flow tester CFT-100C manufactured by Shimadzu Corporation) in accordance with JIS K7210. The measurement was conducted under the conditions of the measurement temperature 190° C. and the load of 2.16 kg.

(5) Bending Stiffness (MPa)

A sheet with a thickness of about 2 mm was produced from the ionomer resin composition by the heat press molding method, and stored at 23° C. for two weeks. The bending stiffness was measured according to JIS K7106. The measurement was conducted under the conditions of the temperature 23° C. and humidity 50 RH %.

(6) Rebound Resilience (%)

A sheet with a thickness of about 2 mm was produced from the ionomer resin composition by the heat press molding method. A circle-shaped test piece having a diameter of 28 mm was cut out of this sheet, and 6 pieces of the test piece were stacked to prepare a cylindrical test piece having a thickness of about 12 mm and a diameter of 28 mm. The cylindrical test piece was subjected to the Lupke type rebound resilience test (testing temperature 23° C., humidity 50 RH %). Preparation of the test piece and the testing method are based on JIS K6255.

(7) Coefficient of Repulsion for Golf Balls

A 198.4 g of metal cylindrical object was forced to collide with each golf ball at a speed of 40 m/sec, and the speeds of the cylindrical object and the golf ball before and after the collision were measured. Based on these speeds and the mass of each object, coefficient of repulsion for each golf ball was calculated. The measurement was conducted by using twelve of each golf ball, and the average value was regarded as the coefficient of repulsion for the golf ball. The coefficient of repulsion of golf ball No. 13 was defined as an index of 100.0, and the coefficient of repulsion of each golf ball was represented by converting the coefficient of repulsion of each golf ball into this index with respect to golf balls No. 1 to No. 17. Likewise, the coefficient of repulsion of golf balls No. 18 to No. 32 were represented as an index by defining the coefficient of repulsion of golf ball No. 28 as an index of 100.0, and the coefficient of repulsion of golf balls No. 33 to No. 49 were represented as an index by defining the coefficient of repulsion of golf ball No. 45 as an index of 100.0.

(8) Abrasion-Resistance

A commercially available sand wedge (available from SRI sports limited, S shaft) was installed on a swing robot available from Golf Laboratories, Inc., and two points of a ball were both hit once at a head speed of 36 m/sec to observe the portions which were hit. Each hit portion was evaluated and ranked into eight levels based on the following criteria, and an average rank score for the two points was calculated. A smaller score indicates higher abrasion-resistance.

0 point: No hitting marks were observed.

1 point: Dot-like peeling (a maximum size is smaller than 3 mm) was observed.

2 point: Dot-like peeling (a maximum size is 3 mm or larger) was observed.

3 point: Line-like peeling (a maximum size is 5 mm or larger) was observed.

4 point: Clear line-like peeling (a maximum size is 5 mm or larger) was observed.

5 point: Deep and wide line-like peeling (a maximum size is 5 mm or larger) was observed.

6 point: Deep and wide peeling which was almost a plane was observed.

7 point: A part of the cover was scraped away as a plane.

(9) Shot Feeling

Actual hitting test was carried out by ten golfers with a metal head driver(W#1). The feeling of the repulsion on the shots was evaluated based on the following criteria. Major result of ten golfers was regarded as the shot feeling of the golf ball.

G (Good): The impact is small.
N (Normal): The impact is normal.
P (Poor): The impact is large.

(10) Durability

A metal-head W#1 driver (XXIO S, loft: 11°, manufactured by SRI Sports Limited) was installed on a swing robot M/C manufactured by Golf Laboratories, Inc. Each golf ball was hit at a head speed of 45 m/sec. This procedure was repeated, and the number of hits required to break the golf ball was counted. It is noted that there was a case where the golf ball looks unbroken but a crack occurs in the intermediate layer. In such a case, whether or not the golf ball was broken was determined based on deformation of the golf ball and difference in sound at hitting of the golf ball. The number of hits for golf ball No. 13 was defined as an index of 100, and the durability of each golf ball was represented by converting the number of hits for each golf ball into this index with respect to golf balls No. 1 to No. 17. Likewise, the durability of golf balls No. 18 to No. 32 were represented as an index by defining the durability of golf ball No. 28 as an index of 100.0, and the durability of golf balls No. 33 to No. 49 were represented as an index by defining the durability of golf ball No. 45 as an index of 100.0. A greater index value indicates that the durability of the golf ball is excellent.

[Production of Golf Balls]

(1) Production of Center

The center rubber compositions having the formulations shown in Table 1 were kneaded and heat-pressed in upper and lower molds, each having a hemispherical cavity, at 170° C. for 15 minutes to prepare spherical centers. The amount of barium sulfate was adjusted appropriately to make a golf ball have a weight of 45.4 g.

TABLE 1

| | Center No. | A | B |
|---|---|---|---|
| Formulation | Polybutadiene rubber | 100 | 100 |
| | Zinc acrylate | 27 | 30 |
| | Zinc oxide | 5 | 5 |
| | Dicumyl peroxide | 0.9 | 0.9 |
| | Diphenyl disulfide | 0.5 | 0.5 |
| | Barium sulfate | Appropriate Amount*) | Appropriate Amount*) |
| Properties | Compression deformation amount (mm) | 3.8 | 3.4 |
| | Center hardness (Shore D) | 41 | 43 |
| | Surface hardness (Shore D) | 50 | 53 |

Formulation: parts by mass
*)Adjustment was made such that the golf ball had a mass of 45.4 g.
Polybutadiene rubber: "BR-730 (high-cis polybutadiene)" manufactured by JSR Corporation.
Zinc acrylate: "ZNDA-90S" manufactured by Nihon Jyoryu Kogyo Co., Ltd.
Zinc oxide: "Ginrei R" manufactured by Toho Zinc Co., Ltd.
Barium sulfate: "Barium Sulfate BD" manufactured by Sakai Chemical Industry Co., Ltd.
Dicumyl peroxide: "Percumyl (registered trademark) D" manufactured by NOF Corporation.
Diphenyl disulfide: manufactured by Sumitomo Seika Chemicals Co., Ltd.

(2) Preparation of Ionomer Resin Composition

Blending materials shown in Tables 2 and 3 were mixed with a twin-screw kneading extruder to prepare the ionomer resin compositions in the pellet form. The extruding conditions were a screw diameter of 45 mm, a screw rotational speed of 200 rpm, and screw L/D=35, and the mixtures were heated to 160 to 230° C. at the die position of the extruder

TABLE 2

| | Ionomer resin composition No. | a | b | c | d | e | f | g | h | i | j | k | l |
|---|---|---|---|---|---|---|---|---|---|---|---|---|---|
| Formulation | (A)Component Surlyn 6320 (Mg) | — | — | — | — | 100 | 100 | — | 100 | — | 100 | — | — |
| | Himilan AM7327(Zn) | 100 | 100 | 100 | 100 | — | — | 100 | — | — | — | 100 | 100 |
| | Himilan AM7329 (Zn, binary copolymer) | — | — | — | — | — | — | — | — | 100 | — | — | — |
| | (B)component Zinc acrylate | 0.1 | 0.5 | 1 | 5 | — | 8 | — | 12 | 0.5 | — | — | — |
| | Zinc methacrylate | — | — | — | — | 0.5 | — | — | — | — | — | — | — |
| | Magnesium stearate | — | — | — | — | — | — | — | — | — | 0.1 | 5 | 60 |
| | Titanium oxide | 4 | 4 | 4 | 4 | 4 | 4 | 4 | 4 | 4 | 4 | 4 | 4 |
| Properties | Melt flow rate (g/10 min) | 2.9 | 1.8 | 0.7 | 0.1 | 1.3 | 0.07 | 1 | NG | 4.6 | 1.2 | 2 | 16.5 |
| | Slab hardness (Shore D) | 43 | 44 | 44 | 44 | 42 | 45 | 42 | | 62 | 42 | 42 | 52 |
| | Bending stiffness (MPa) | 25 | 27 | 30 | 35 | 30 | 40 | 24 | | 188 | 25 | 34 | 144 |
| | Rebound resilience (%) | 48 | 48 | 49 | 50 | 57 | 60 | 47 | | 49 | 47 | 48 | 65 |

Formulation: parts by mass, NG: Impossible to measure

Surlyn 6320: Magnesium ion neutralized ethylene-methacrylic acid-butyl acrylate ternary copolymer ionomer resin (Melt flow rate(190° C. * 2.16 kg): 1.0 g/10 min)available from E. I. du Pont de Nemours and Company Himilan AM7327: Zinc ion neutralized ethylene-methacrylic acid-butyl acrylate copolymer ionomer resin (Melt flow rate(190° C. * 2.16 kg): 0.7 g/10 min) available from Du Pont-Mitsui Polychemicals Co., Ltd Himilan AM7329: Zinc ion neutralized ethylene-methacrylic acid copolymer ionomer resin (Melt flow rate (190° C. * 2.16 kg): 5 g/10 min)available from Du Pont-Mitsui Polychemicals Co., Ltd As apparent from Table 2, the rebound resilience is improved by adding from 0.05 part to 10 parts by mass of (B) the metal salt of the unsaturated carboxylic acid to 100 parts by mass of (A) the ternary ionomer resin.

TABLE 3

| | Ionomer resin composition No. | m | n | o |
|---|---|---|---|---|
| Formulation | Himilan 1555 | 48 | 33 | — |
| | Himilan 1605 | — | — | 50 |
| | Himilan AM7329 | 47 | 33 | 50 |
| | Rabalon T3221C | 5 | 34 | — |
| | Titanium oxide | 4 | 4 | 4 |
| Properties | Melt flow rate (g/10 min) | 8 | 6 | 4 |
| | Slab hardness (Shore D) | 59 | 45 | 65 |
| | Bending stiffness (MPa) | 224 | 83 | 290 |
| | Rebound resilience (%) | 53 | 55 | 55 |

Note on Table 3:

Formulation: parts by mass

Himilan 1555: Sodium ion neutralized ethylene-methacrylic acid copolymer ionomer resin (MFR: 10 g/10 min, Shore D hardness: 60) available from Du Pont-Mitsui Polychemicals Co., Ltd Himilan 1605: Sodium ion neutralized ethylene-methacrylic acid copolymer ionomer resin (MFR: 2.8 g/10 min, Shore D hardness: 65) available from Du Pont-Mitsui Polychemicals Co., Ltd Himilan AM7329: Zinc ion neutralized ethylene-methacrylic acid copolymer ionomer resin (MFR: 5 g/10 min) available from Du Pont-Mitsui Polychemicals Co., Ltd Rabalon T3221C: Polystyrene elastomer available from Mitsubishi Chemical Corporation.

(3) Production of Golf Ball Bodies

Golf ball No. 1 to No. 17

The ionomer resin compositions a to I shown in Table 2 were used as the intermediate layer composition, and injection-molded onto the spherical centers A to form the intermediate layers covering the centers and prepare spherical cores. Subsequently, golf balls were produced by injection-molding the ionomer resin composition m shown in Table 3 onto the spherical cores to form the cover and prepare the golf balls.

Golf ball No. 18 to No. 32

The ionomer resin compositions a to I shown in Table 2 were injection molded to prepare centers. The ionomer resin composition n shown in Table 3 was injection-molded onto the spherical centers to form the intermediate layers covering the centers and prepare spherical cores. Subsequently, golf balls were produced by injection-molding the ionomer resin composition m shown in Table 3 onto the spherical cores to form the cover and prepare the golf balls.

Golf ball No. 33 to No. 49

The ionomer resin composition o shown in Table 3 was used as the intermediate layer composition, and injection-molded onto the spherical centers B to form the intermediate layers covering the centers and prepare spherical cores. Subsequently, golf balls were produced by injection-molding the ionomer resin compositions a to I shown in Table 2 onto the spherical cores to form the cover and prepare the golf balls.

Upper and lower molds for the intermediate layer and the cover have a spherical cavity with pimples, a part of which serves as a hold pin which is extendable and retractable. When molding the intermediate layer, the hold pins were protruded to hold the center after the center was put in, the intermediate layer composition heated to 260° C. was charged into the mold under a pressure of 80 tons within 0.3 seconds, and cooled for 30 seconds. Then, the mold was opened, and the cores were taken out from the mold. When molding the cover, the hold pins were protruded to hold the core after the core was put in, the cover composition heated to 210° C. was charged into the mold under a pressure of 80 tons within 0.3 seconds, and cooled for 30 seconds. Then, the mold was opened, and the golf ball bodies were taken out from the mold. The surface of the obtained golf ball bodies were treated with sandblast, marked, and painted with a clear paint. The paint was dried in an oven at 40° C. to form a paint film, and golf balls having a diameter of 42.8 mm and a mass of 45.4 g were obtained. The results of evaluations as well as golf ball constructions were also shown in tables 4 to 6.

TABLE 4

| Golf ball No. | 1 | 2 | 3 | 4 | 5 | 6 | 7 | 8 | 9 |
|---|---|---|---|---|---|---|---|---|---|
| Center No. | A | A | A | A | A | A | A | A | A |
| Center diameter (mm) | 38.8 | 38.8 | 38.8 | 39.8 | 39.2 | 38.4 | 37.6 | 38.8 | 38.8 |
| Intermediate layer composition | a | b | c | c | c | c | c | d | e |
| Intermediate layer thickness (mm) | 1.0 | 1.0 | 1.0 | 0.5 | 0.8 | 1.2 | 1.6 | 1.0 | 1.0 |
| Cover composition | m | m | m | m | m | m | m | m | m |
| Cover thickness (mm) | 1.0 | 1.0 | 1.0 | 1.0 | 1.0 | 1.0 | 1.0 | 1.0 | 1.0 |
| Center compression deformation amount (mm) | 3.8 | 3.8 | 3.8 | 3.8 | 3.8 | 3.8 | 3.8 | 3.8 | 3.8 |
| Core Compression deformation amount (mm) | 3.48 | 3.47 | 3.47 | 3.49 | 3.47 | 3.45 | 3.43 | 3.46 | 3.47 |
| Golf ball diameter (mm) | 42.8 | 42.8 | 42.8 | 42.8 | 42.8 | 42.8 | 42.8 | 42.8 | 42.8 |
| Golf ball compression deformation amount (mm) | 3.28 | 3.27 | 3.27 | 3.29 | 3.27 | 3.25 | 3.23 | 3.26 | 3.27 |
| Golf ball coefficient of Repulsion | 100.2 | 100.2 | 100.3 | 100.4 | 100.3 | 100.2 | 100.1 | 100.3 | 100.2 |
| Durability | 100 | 101 | 102 | 100 | 101 | 105 | 110 | 101 | 100 |
| Shot feeling | G | G | G | G | G | G | G | G | G |

| Golf ball No. | 10 | 11 | 12 | 13 | 14 | 15 | 16 | 17 |
|---|---|---|---|---|---|---|---|---|
| Center No. | A | A | A | A | A | A | A | A |
| Center diameter (mm) | 38.8 | 38.8 | 38.8 | 38.8 | 38.8 | 38.8 | 36.6 | 38.8 |
| Intermediate layer composition | f | j | k | g | h | i | c | l |
| Intermediate layer thickness (mm) | 1.0 | 1.0 | 1.0 | 1.0 | — | 1.0 | 2.1 | 1.0 |
| Cover composition | m | m | m | m | m | m | m | m |
| Cover thickness (mm) | 1.0 | 1.0 | 1.0 | 1.0 | — | 1.0 | 1.0 | 1.0 |
| Center compression deformation amount (mm) | 3.8 | 3.8 | 3.8 | 3.8 | 3.8 | 3.8 | 3.8 | 3.8 |
| Core Compression deformation amount (mm) | 3.45 | 3.48 | 3.46 | 3.48 | — | 3.38 | 3.4 | 3.45 |
| Golf ball diameter (mm) | 42.8 | 42.8 | 42.8 | 42.8 | — | 42.8 | 42.8 | 42.8 |
| Golf ball compression deformation amount (mm) | 3.25 | 3.28 | 3.26 | 3.28 | — | 3.18 | 3.2 | 3.25 |
| Golf ball coefficient of Repulsion | 100.4 | 100.0 | 100.1 | 100.0 | — | 100.2 | 99.9 | 100.3 |
| Durability | 101 | 100 | 99 | 100 | — | 100 | 115 | 90 |
| Shot feeling | G | G | G | G | — | N | N | G |

Shot feeling:
G(good),
N(Normal),
P(Poor)

TABLE 5

| Golf ball No. | 18 | 19 | 20 | 21 | 22 | 23 | 24 | 25 |
|---|---|---|---|---|---|---|---|---|
| Center No. | a | b | c | c | c | d | e | f |
| Center diameter (mm) | 38.8 | 38.8 | 38.8 | 39.8 | 37.6 | 38.8 | 38.8 | 38.8 |
| Intermediate layer composition | n | n | n | n | n | n | n | n |
| Intermediate layer thickness (mm) | 1.0 | 1.0 | 1.0 | 0.5 | 1.6 | 1.0 | 1.0 | 1.0 |
| Cover composition | m | m | m | m | m | m | m | m |
| Cover thickness (mm) | 1.0 | 1.0 | 1.0 | 1.0 | 1.0 | 1.0 | 1.0 | 1.0 |
| Center compression deformation amount (mm) | 3.13 | 2.98 | 2.98 | 2.98 | 2.98 | 2.98 | 3.28 | 2.83 |
| Core Compression deformation amount (mm) | 2.92 | 2.77 | 2.77 | 2.77 | 2.77 | 2.77 | 3.07 | 2.62 |
| Golf ball diameter (mm) | 42.8 | 42.8 | 42.8 | 42.8 | 42.8 | 42.8 | 42.8 | 42.8 |
| Golf ball compression deformation amount (mm) | 2.71 | 2.56 | 2.3 | 2.56 | 2.56 | 2.29 | 2.3 | 2.29 |
| Golf ball coefficient of Repulsion | 100.3 | 100.3 | 100.4 | 100.5 | 100.2 | 100.4 | 100.2 | 100.5 |
| Durability | 100 | 101 | 101 | 100 | 101 | 101 | 100 | 103 |
| Shot feeling | G | G | G | G | G | G | G | G |

| Golf ball No. | 26 | 27 | 28 | 29 | 30 | 31 | 32 |
|---|---|---|---|---|---|---|---|
| Center No. | j | k | g | h | i | c | l |
| Center diameter (mm) | 38.8 | 38.8 | 38.8 | — | 38.8 | 34.6 | 38.8 |
| Intermediate layer composition | n | n | n | n | n | n | n |
| Intermediate layer thickness (mm) | 1.0 | 1.0 | 1.0 | — | 1.0 | 2.1 | 1.0 |
| Cover composition | m | m | m | m | m | m | m |
| Cover thickness (mm) | 1.0 | 1.0 | 1.0 | — | 1.0 | 2.0 | 1.0 |
| Center compression deformation amount (mm) | 3.28 | 3.28 | 3.28 | — | 1.04 | 2.98 | 1.68 |
| Core Compression deformation amount (mm) | 3.07 | 3.07 | 3.07 | — | 1.00 | 2.77 | 1.54 |

TABLE 5-continued

|  |  |  |  |  |  |  |
|---|---|---|---|---|---|---|
| Golf ball diameter (mm) | 42.8 | 42.8 | 42.8 | — | 42.8 | 42.8 | 42.8 |
| Golf ball compression deformation amount (mm) | 2.31 | 2.3 | 2.31 | — | 0.95 | 2.56 | 1.42 |
| Golf ball coefficient of Repulsion | 100.0 | 100.0 | 100.0 | — | 100.6 | 99.8 | 100.4 |
| Durability | 100 | 100 | 100 | — | 80 | 105 | 92 |
| Shot feeling | G | G | G | — | P | G | P |

Shot feeling:
G(good),
N(Normal),
P(Poor)

TABLE 6

| Golf ball No. | 33 | 34 | 35 | 36 | 37 | 38 | 39 | 40 | 41 |
|---|---|---|---|---|---|---|---|---|---|
| Center No. | B | B | B | B | B | B | B | B | B |
| Center diameter (mm) | 38.8 | 38.8 | 38.8 | 39.8 | 39.2 | 38.4 | 37.6 | 38.8 | 38.8 |
| Intermediate layer composition | o | o | o | o | o | o | o | o | o |
| Intermediate layer thickness (mm) | 1.0 | 1.0 | 1.0 | 1.0 | 1.0 | 1.0 | 1.0 | 1.0 | 1.0 |
| Cover composition | a | b | c | c | c | c | c | d | e |
| Cover thickness (mm) | 1.0 | 1.0 | 1.0 | 0.5 | 0.8 | 1.2 | 1.6 | 1.0 | 1.0 |
| Center compression deformation amount (mm) | 3.4 | 3.4 | 3.4 | 3.4 | 3.4 | 3.4 | 3.4 | 3.4 | 3.4 |
| Core Compression deformation amount (mm) | 2.66 | 2.66 | 2.66 | 2.66 | 2.66 | 2.66 | 2.66 | 2.66 | 2.66 |
| Golf ball diameter (mm) | 42.8 | 42.8 | 42.8 | 42.8 | 42.8 | 42.8 | 42.8 | 42.8 | 42.8 |
| Golf ball compression deformation amount (mm) | 2.52 | 2.51 | 2.5 | 2.51 | 2.5 | 2.49 | 2.47 | 2.49 | 2.5 |
| Golf ball coefficient of Repulsion | 100.1 | 100.2 | 100.3 | 100.3 | 100.3 | 100.2 | 100.1 | 100.3 | 100.2 |
| Abrasion resistance | 2 | 2 | 2 | 3 | 2 | 2 | 1 | 2 | 2 |
| Durability | 105 | 109 | 112 | 104 | 108 | 115 | 125 | 130 | 111 |
| Shot feeling | G | G | G | G | G | G | N | N | G |

| Golf ball No. | 42 | 43 | 44 | 45 | 46 | 47 | 48 | 49 |
|---|---|---|---|---|---|---|---|---|
| Center No. | B | B | B | B | B | B | B | B |
| Center diameter (mm) | 38.8 | 38.8 | 38.8 | 38.8 | 38.8 | 38.8 | 36.6 | 38.8 |
| Intermediate layer composition | o | o | o | o | o | o | o | o |
| Intermediate layer thickness (mm) | 1.0 | 1.0 | 1.0 | 1.0 | 1.0 | 1.0 | 1.0 | 1.0 |
| Cover composition | f | j | k | g | h | i | c | l |
| Cover thickness (mm) | 1.0 | 1.0 | 1.0 | — | | 1.0 | 2.1 | 1.0 |
| Center compression deformation amount (mm) | 3.4 | 3.4 | 3.4 | 3.4 | 3.4 | 3.4 | 3.4 | 3.4 |
| Core Compression deformation amount (mm) | 2.66 | 2.66 | 2.66 | 2.66 | 2.66 | 2.66 | 2.66 | 2.66 |
| Golf ball diameter (mm) | 42.8 | 42.8 | 42.8 | 42.8 | — | 42.8 | 42.8 | 42.8 |
| Golf ball compression deformation amount (mm) | 2.48 | 2.52 | 2.52 | 2.52 | — | 2.35 | 2.4 | 2.4 |
| Golf ball coefficient of Repulsion | 100.3 | 100.0 | 100.0 | 100.0 | — | 100.3 | 99.9 | 100.2 |
| Abrasion resistance | 1 | 5 | 5 | 5 | — | 2 | 1 | 4 |
| Durability | 148 | 101 | 98 | 100 | — | 100 | 129 | 67 |
| Shot feeling | N | G | G | G | — | P | N | P |

Shot feeling:
G(good),
N(Normal),
P(Poor)

As apparent from Tables No. 4 to No. 6, the golf balls of the present invention are excellent in the resilience and durability as well as shot feeling. The golf balls using the ionomer resin of the present invention for the cover are excellent in the abrasion resistance.

The present invention is directed to the golf ball, especially, suitable for the golf ball using the ionomer resin composition. This application is based on Japanese Patent application No. 2009-248896 filed on Oct. 29, 2009, the contents of which are hereby incorporated by reference.

The invention claimed is:

1. A golf ball comprising
a core having a center and at least one intermediate layer disposed around the center, and
a cover disposed around the core,
wherein the at least one intermediate layer is formed from an ionomer resin composition which comprises:
 100 parts by mass of (A) an ionomer resin of a ternary copolymer composed of ethylene, α,β-unsaturated carboxylic acid having 3 to 8 carbon atoms and α,β-unsaturated carboxylic acid ester, and
 from 0.05 part to 10 parts by mass of (B) a metal salt of an unsaturated carboxylic acid.

2. The golf ball according to claim 1, wherein (A) the ionomer resin of the ternary copolymer is neutralized with at least one metal ion selected from the group consisting of magnesium, zinc and sodium.

3. The golf ball according to claim 1, wherein (B) the metal salt of the unsaturated carboxylic acid is a metal salt of an unsaturated carboxylic acid having 3 to 8 carbon atoms.

4. The golf ball according to claim 1, wherein (B) the metal salt of the unsaturated carboxylic acid is a metal salt of acrylic acid or methacrylic acid.

5. The golf ball according to claim 1, wherein (B) the metal salt of the unsaturated carboxylic acid is a zinc salt of the unsaturated carboxylic acid.

6. The golf ball according to claim 1, wherein the ionomer resin composition has a slab hardness in a range from 20 to 70 in Shore D hardness.

7. The golf ball according to claim 1, wherein the intermediate layer has a thickness ranging from 0.1 mm to 2.0 mm.

8. The golf ball according to claim 1, wherein the golf ball has a compression deformation amount ranging from 2.0 mm to 4.0 mm when applying a load from 98 N as an initial load to 1275 N as a final load.

9. The golf ball according to claim 1, wherein the ionomer resin composition has a melt flow rate ranging from 0.01 g/10 min to 100 g/10 min.

10. The golf ball according to claim 1, wherein the ionomer resin composition has a bending stiffness ranging from 10 MPa to 450 MPa.

11. The golf ball according to claim 1, wherein the ionomer resin composition has a rebound resilience of 40% or more.

12. The golf ball according to claim 1, wherein the center is formed from a center rubber composition containing a base rubber and has a compression deformation amount ranging from 1.9 mm to 4.0 mm when applying a load from 98 N as an initial load to 1275 N as a final load.

13. The golf ball according to claim 1, wherein the center is formed from a center rubber composition containing a base rubber and has a center hardness ranging from 30 to 50 in Shore D hardness.

14. The golf ball according to claim 1, wherein the core has a diameter ranging from 39.0 mm to 42.2 mm.

15. The golf ball according to claim 1, wherein the center is formed from a center rubber composition containing a base rubber and has a surface hardness ranging from 40 to 65 in Shore D hardness.

* * * * *